United States Patent [19]

Schmidt

[11] Patent Number: 5,898,973
[45] Date of Patent: May 4, 1999

[54] HANDLE IN A MOTOR VEHICLE

[75] Inventor: Reinhard Schmidt, Lennestadt, Germany

[73] Assignee: R. Schmidt GmbH, Lennestadt, Germany

[21] Appl. No.: 08/897,104

[22] Filed: Jul. 18, 1997

[30] Foreign Application Priority Data

Jul. 19, 1996 [DE] Germany ............... 196 29 197

[51] Int. Cl.$^6$ .................................................. A47B 95/02
[52] U.S. Cl. ................................................ 16/112; 16/126
[58] Field of Search ........................ 16/112, 111 R, 16/110 R, 123, 126, DIG. 41, 54, 50, 51, 52, 72; 292/336.3, DIG. 30, DIG. 31; 74/543, 548, 551.2, 551.9

[56] References Cited

U.S. PATENT DOCUMENTS

| | | | |
|---|---|---|---|
| 5,056,838 | 10/1991 | Tiesler et al. | 292/336.3 |
| 5,092,642 | 3/1992 | Lindmayer et al. | 292/336.3 |
| 5,165,507 | 11/1992 | Ohshima | 16/52 |
| 5,211,269 | 5/1993 | Ohshima | 16/52 |
| 5,651,163 | 7/1997 | Tamaki | 16/112 |
| 5,743,575 | 4/1998 | McFarland | 292/336.3 |

FOREIGN PATENT DOCUMENTS

| | | |
|---|---|---|
| 3513293 | 10/1986 | Germany . |
| 296 04 260 U | 6/1996 | Germany . |
| 29605343 | 7/1996 | Germany . |

OTHER PUBLICATIONS

Abstract of JP 04–285336, Oct. 9, 1992, Patent Abstracts of Japan, vol. 017, No. 088 (M–1370, Feb. 22, 1993.

*Primary Examiner*—Chuck Y. Mah
*Attorney, Agent, or Firm*—Evenson, McKeown, Edwards & Lenahan, PLLC

[57] ABSTRACT

A handle in a motor vehicle has a grip element that can be manually swivelled about a grip element axis from a home position. The handle may be moved back into the home position by spring tension. An attenuation device has an element which can rotate around the grip element axis on which a braking factor is exerted by a viscous material when moving back into the home position.

13 Claims, 2 Drawing Sheets

5,898,973

1

HANDLE IN A MOTOR VEHICLE

BACKGROUND OF THE INVENTION

This invention relates to a handle in a motor vehicle with a grip element that can be manually swivelled away from a home position and then swivelled back into the home position by spring tension. The handle has an attenuation device with an element that rotates around the axis of the grip element. A braking force or factor is provided by a viscous material.

The attenuation device ensures that the grip element is moved back into the home position with braking in such a way that a disturbing noise is avoided when the home position is reached.

SUMMARY OF THE INVENTION

The primary object of the invention is to produce a handle of the type mentioned above in which the braked return of the grip element into its home positions is guaranteed over a long operating time.

The viscous material, which can be silicon oil, fat, or a similarly suitable viscous material, is present in small amounts. As a result, the danger of losing a large amount of viscous material through leaks, especially over a long operating period, and losing attenuating action as a result is minimized. Dummy elements can form boundaries of chambers. The dummy elements can also float so as to be freely mobile in the viscous material.

The dummy elements and the chambers in which the viscous material is accommodated can be ring shaped, sleeve-like, or spool box-like. Ring-shaped chambers can, for example, be formed by rings such as O-rings. Spool box-like chambers can be formed by crossing-over packing washers or other barriers. The chambers can also be stationary. In this case, the elements defining the chambers, such as the O-rings or the crossing-over packing washers, can be connected to a bearing housing surrounding the shaft of the attenuation device. It is also possible to have the chambers capable of rotating together with the shaft in a bearing housing.

A stationary chamber arrangement permits the elements demarcating the chambers to be constructed so that they lie and slide on the shaft. When the chambers rotate together with the shaft, the elements defining the chambers are constructed so that they lie on the interior of the bearing housing surrounding the shaft.

BRIEF DESCRIPTION OF THE DRAWINGS

The invention will be discussed in even greater detail based on the figures that show an embodiment.

2

DESCRIPTION OF THE PREFERRED EMBODIMENTS

Figure 1:
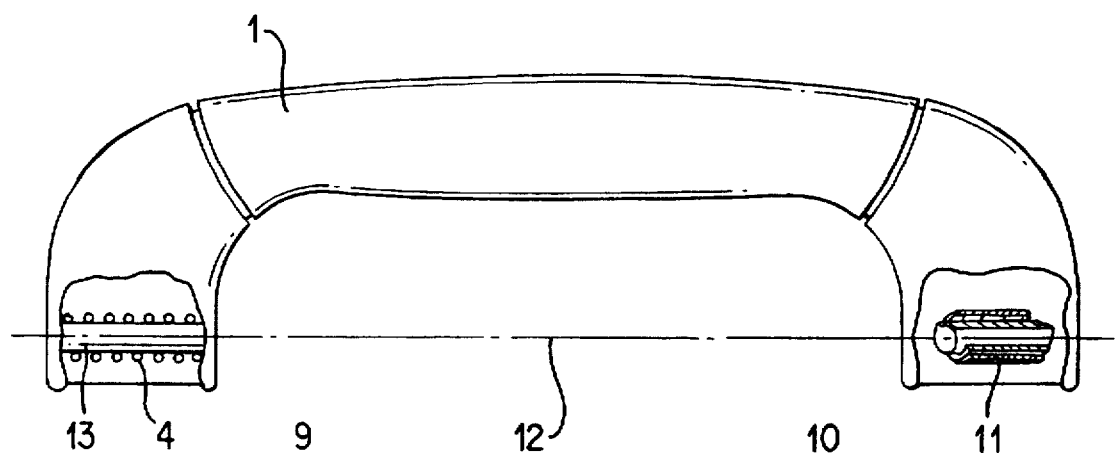
FIG. 1 shows a grip which is an embodiment of the invention.

An embodiment of the handle is represented in FIG. 1. This possesses a grip element 1 that can be manually swivelled on a grip element axis 12 from the home position. The grip element is swivelled on bearings 9 and 10 in the interior of a motor vehicle on the motor vehicle body. The grip element 1 can be moved back into the home position by spring tension, which in the embodiment represented consists of a return spring 4 constructed as a coil spring. The return spring 4 is situated on bearing 9. With one end, the return spring 4 is braced on the motor vehicle body, and with its other end, the return spring 4 is braced on the grip element 1. The return spring 4 can be wrapped around a bearing bolt 13 which serves to form the grip element axis 12. The grip element 1 can be swivelled on the bearing pin 13 on bearing 9.

An attenuation device 11 is located on the other bearing 10 which exerts a braking factor on the return motion of the grip element 1 which is acted upon by the return spring 4. In this way, a braked return movement of the grip element 1 into the home position is achieved.

Figure 2:
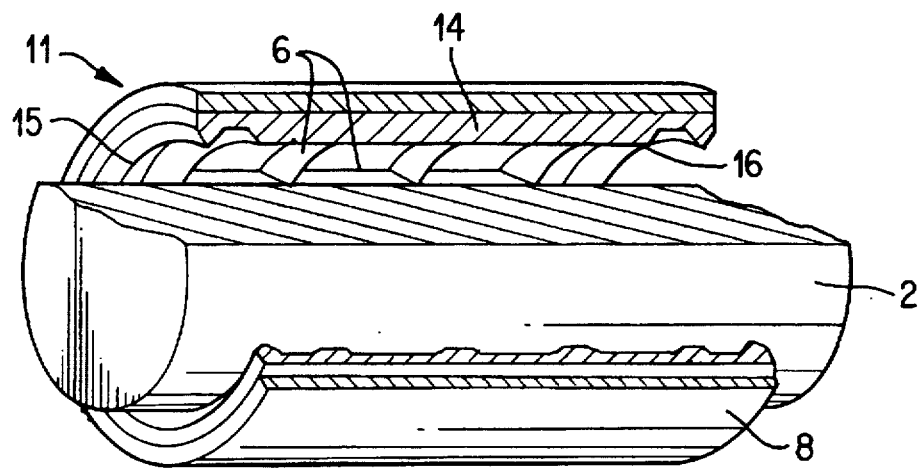
FIG. 2 shows a first form of construction for an attenuation device that can be applied in connection with the embodiment.
Figure 3:
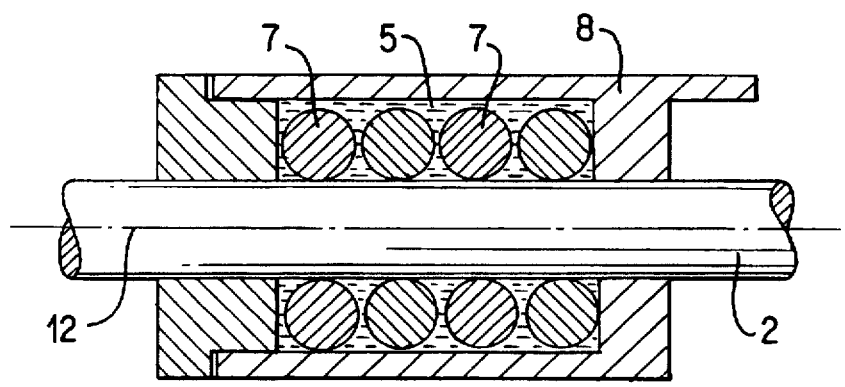
FIG. 3 shows a second form of construction for an attenuation device that can be applied in connection with the embodiment of FIG. 1.

Specific embodiments for the attenuation device 11 are represented in FIGS. 2 and 3. Both forms of construction possess a bearing housing 8 in which a shaft 2 is mounted. The bearing housing 8 and the shaft 2 can be rotated in relation to one another in both forms of construction. The bearing housing 8 can be connected to the motor vehicle body in both forms of construction, and the shaft 2, which is connected to the grip element 1, can be pivoted in the bearing housing 8. It is also possible, however, that with both forms of construction, the shaft is connected to the motor vehicle body, and the bearing housing 8, which is connected to the grip element 1, is pivoted on the shaft 2.

With both forms of construction of FIGS. 2 and 3, a viscous material 5 is located in the bearing house 8, which is represented in FIG. 3. The viscous material 5 is situated between the shaft 2 and the interior of the bearing housing 8. In the specific embodiments, chambers are formed by dummy elements constructed as limiting barriers 6 in which the viscous material 5 is provided.

With the specific embodiment of FIG. 2, the chambers in which the viscous material is provided are constructed in the form of spool boxes. The limiting barriers 6, which can have a sealing action, define the spool box-like chambers. The barriers run linear and parallel to the shaft axis or the grip element axis 12 as well as perpendicular to this around the grip element axis 12. The barriers of packing washers 6 are made of an elastic material; for example, rubber can be molded into the foundation of a collar 14. The entire collar can consist of elastic material, especially rubber.

With the specific embodiment represented in FIG. 2, the collar 14 with the spool box-like chambers for the viscous material is connected fast with the bearing housing 8, whereby the spool box-like chambers are open in the direction to the shaft 2. It is also possible, however, for the collar 14 to be connected fast with the shaft 2 and the spool box-like chambers to be opened outwardly in the direction of the interior of the bearing housing 8.

The barriers forming the chambers lie sliding like packing washers on the interior of the housing 8 or on the shaft 2. The viscous material, which exerts a braking factor in connection with the relative rotation of shaft 2 and housing 8, is positioned in the respective spool box-like chambers. Circular packing washers 15 and 16 are provided on the ends for sealing. The respective barriers 6, which form the spool box-like chambers for the viscous material, can, with rounded off surfaces, lie on the shaft 2, or on the interior of the housing 8.

With the specific embodiment represented in FIG. 3, the ring-shaped chambers for the viscous material 5 are formed by rings 7 arranged around the shaft 2, which can be constructed as O-rings. The rings 7 can lie form-locking on the shaft 2. The rings 7 can also float (be freely mobile) in the viscous material 5. The two outer rings can effect the necessary sealing toward the outside in each case.

Silicon oil or a viscous grease or similar material with an attenuating action is suitable as a viscous material. The kinematic viscosity of the viscous material 5 comes to about 1,000,000 $mm^2/s$. According to the configuration of the grip element 1, deviations from this viscosity value can be selected in the range of about ±20%. The viscosity is related to a temperature of 25° C.

Figure 4:
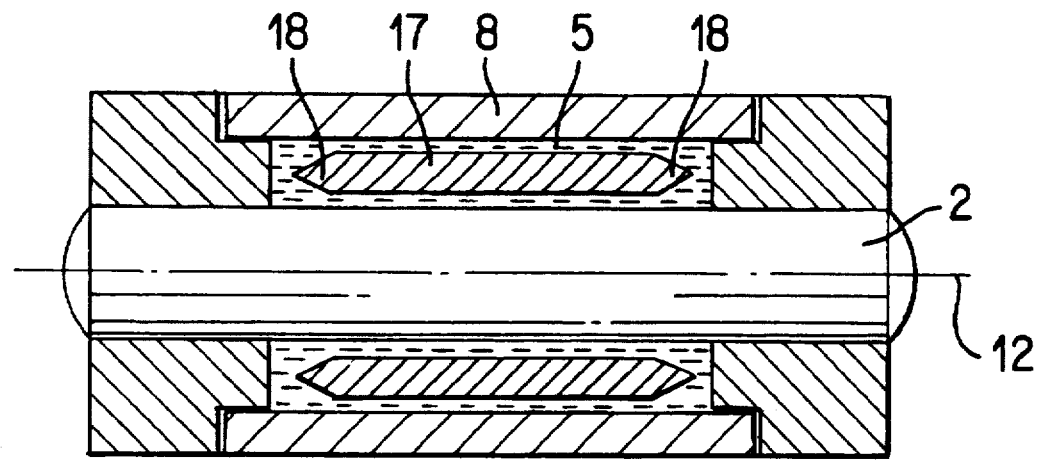
FIG. 4 shows a third form of construction for an attenuation device that can be applied in connection with the embodiment of FIG. 1.
Figure 5:
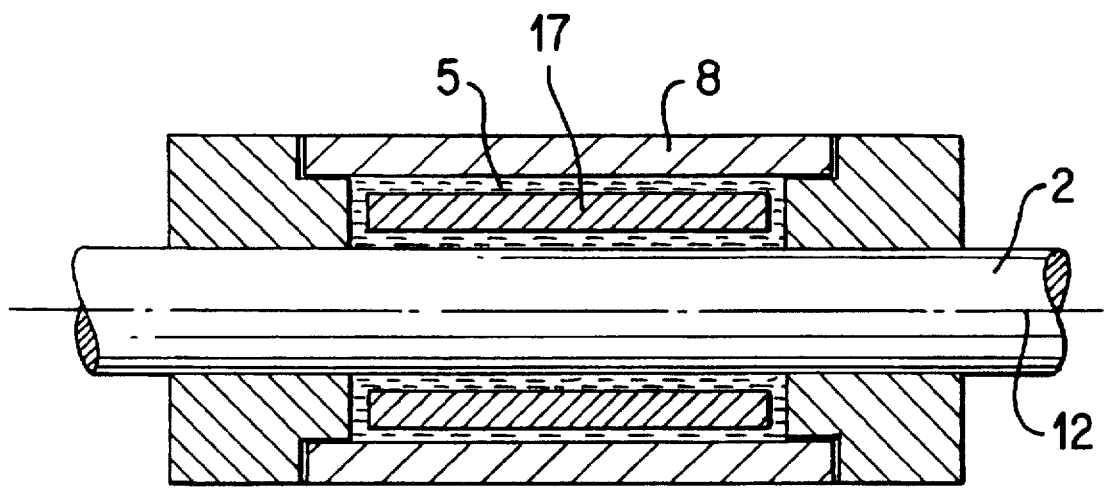
FIG. 5 shows a fourth form of construction for an attenuation device that can be applied in connection with the embodiment of FIG. 1.

With the embodiments represented in FIGS. 4 and 5, a sleeve 15 is situated in the viscous material 5 as a dummy element. The sleeve 15 surrounds the grip element axis 12. With the specific embodiment represented in FIG. 4, the sleeve 15 possesses projections 16 tapering to a point at its ends which have a circular form on the respective end, which extend around the grip element axis 12.

With these specific embodiments as well, the viscous material 5 is densely arranged in the housing 8. The housing 8 can be stationary and the shaft 2 rotatable in relation to the housing. For this, for example, the form of construction represented in FIG. 5 is suitable. The shaft can also, however, be connected as stationary with the motor vehicle body, and the housing 8 can be connected as rotating with the grip element for rotation around the shaft 2. The form of construction represented in FIG. 4, for example, is suitable for this. The projections tapering to a point 16 can be provided in both forms of construction of FIGS. 4 and 5.

I claim:

1. A handle for placement in an interior of a motor vehicle comprising:

a grip element that can be manually swivelled about a grip element axis away from a home position and swivelled back into said home position;

first and second bearings, on which the grip element is swivelled, adapted to be placed in the interior of the motor vehicle;

a return spring situated on the first bearing for generating spring tension to swivel the grip element back into said home position;

an attenuation device situated on the second bearing for generating a braking force on the grip element as said grip element is swivelled back into the home position;

said second bearing comprising a bearing housing;

a shaft mounted in the bearing housing so that the bearing housing and the shaft can be rotated in relation to one another;

one of said bearing housing and said shaft defining a rotatable element that rotates about the grip element axis, the other one of said bearing housing and said shaft defining a stationary element;

said attenuation device including a viscous material situated between the shaft and an interior of the bearing housing for exerting said braking force on said rotatable element, and at least one dummy element defining limiting barriers disposed between said shaft and said bearing housing, said limiting barriers forming chambers in which the viscous material is provided around the shaft.

2. A handle according to claim 1, wherein each dummy element is freely movable in the viscous material.

3. A handle according to claim 1, wherein each dummy element is ring-shaped.

4. A handle according to claim 1, wherein said chambers are spool box-like chambers.

5. A handle according to claim 4, wherein the chambers are formed on said stationary element.

6. A handle according to claim 4, wherein the chambers are formed on said rotatable element.

7. A handle according to claim 4, wherein the chambers are connected with said bearing housing.

8. A handle according to claim 4, wherein the chambers are connected to the shaft.

9. A handle according to claim 1, wherein said dummy element is a sleeve-like dummy element arranged in the viscous material.

10. A handle according to claim 9, wherein the sleeve-like dummy element has a circular projection lying on both ends thereof around an axis of the shaft.

11. A handle according to claim 1, wherein each dummy element is slidable on the shaft or on said bearing housing surrounding the shaft.

12. A handle according to claim 11, wherein each dummy element consists of elastic material.

13. A handle according to claim 1, wherein the viscous material has a kinematic viscosity of approximately 1,000,000 $mm^2/s$ at 25° C.

* * * * *